US012205338B2

(12) United States Patent
Kim et al.

(10) Patent No.: US 12,205,338 B2
(45) Date of Patent: Jan. 21, 2025

(54) SEGMENTATION METHOD AND SEGMENTATION APPARATUS

(71) Applicants: The Board of Trustees of the University of Illinois (Urbana, IL), Urbana, IL (US); SAMSUNG ELECTRONICS CO., LTD., Suwon-si (KR)

(72) Inventors: Jihye Kim, Anyang-si (KR); Raymond Alexander Yeh, Urbana, IL (US); Alexander Gerhard Schwing, Urbana, IL (US); Yuan-Ting Hu, Urbana, IL (US)

(73) Assignees: THE BOARD OF TRUSTEES OF THE UNIVERSITY OF ILLINOIS, Urbana, IL (US); Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 17/518,026

(22) Filed: Nov. 3, 2021

(65) Prior Publication Data
US 2022/0148284 A1    May 12, 2022

Related U.S. Application Data

(60) Provisional application No. 63/112,992, filed on Nov. 12, 2020.

(30) Foreign Application Priority Data

Dec. 22, 2020   (KR) .................. 10-2020-0180688

(51) Int. Cl.
    *G06V 10/25*    (2022.01)
    *G06T 7/11*     (2017.01)
    *G06V 10/24*    (2022.01)

(52) U.S. Cl.
    CPC ............. *G06V 10/25* (2022.01); *G06T 7/11* (2017.01); *G06V 10/24* (2022.01)

(58) Field of Classification Search
    CPC . G06T 2207/10016; G06T 2207/20081; G06T 2207/20084; G06T 7/11;
    (Continued)

(56) References Cited

U.S. PATENT DOCUMENTS

| 10,635,927 B2 | 4/2020 | Chen et al. |
| 2018/0158197 A1* | 6/2018 | Dasgupta ............. H04N 13/243 |
| 2019/0304076 A1 | 10/2019 | Nina Paravecino et al. |

FOREIGN PATENT DOCUMENTS

| CN | 111489373 A | 8/2020 |
| KR | 2002-0080048 A | 10/2002 |
| KR | 10-2019-0024689 A | 3/2019 |

OTHER PUBLICATIONS

Yang et al, "Embodied Amodal Recognition: Learning to Move to Perceive Objects", ICCV, 2019. (Year: 2019).*
(Continued)

*Primary Examiner* — Ruiping Li
(74) *Attorney, Agent, or Firm* — NSIP Law

(57) ABSTRACT

A segmentation method and segmentation apparatus are provided, where the segmentation method includes receiving image frames comprising a current frame and an adjacent frame to the current frame, determining a feature map to aggregate the image frames based on temporal information between the current frame and the adjacent frame, extracting a feature of a region of interest (ROI) corresponding to instances included in the current frame from the feature map, predicting a class of an object corresponding to the ROI based on the feature of the ROI, and segmenting the
(Continued)

instances by correcting an amodal mask predicted corresponding to the class of the object based on the feature of the ROI.

23 Claims, 8 Drawing Sheets

(58) Field of Classification Search
CPC ......... G06T 7/174; G06T 7/248; G06T 7/254; G06V 10/24; G06V 10/25; G06V 10/82
See application file for complete search history.

(56) References Cited

OTHER PUBLICATIONS

Abbas et al, "Region-based Object Detection and Classification using Faster R-CNN", CICT, 2018 (Year: 2018).*
Qi et al, "Amodal Instance Segmentation with KINS Dataset", CVPR, 2019, (Year: 2019).*
Johnson et al, "DenseCap: Fully Convolutional Localization Networks for Dense Captioning", CVPR, 2016 (Year: 2016).*
Hu, Yuan-Ting, et al., "Sail-VOS: Semantic Amodal Instance Level Video Object Segmentation—A Synthetic Dataset and Baselines," *Proceedings of the IEEE/CVF Conference on Computer Vision and Pattern Recognition*, 2019 (pp. 3105-3115).
Yang, Jianwei, et al., "Embodied Amodal Recognition: Learning to Move to Perceive Objects," *Proceedings of the IEEE/CVF International Conference on Computer Vision*, 2019 (pp. 2040-2050).

* cited by examiner

SEGMENTATION METHOD AND SEGMENTATION APPARATUS

CROSS-REFERENCE TO RELATED APPLICATIONS

This application claims the benefit under 35 U.S.C. § 119(e) of U.S. Provisional Application No. 63/112,992 filed on Nov. 12, 2020, in the U.S. Patent and Trademark Office, and claims the benefit under 35 U.S.C. § 119(a) of Korean Patent Application No. 10-2020-0180688 filed on Dec. 22, 2020, in the Korean Intellectual Property Office, the entire disclosures of which are incorporated herein by reference for all purposes.

BACKGROUND

Field

The following description relates to a segmentation method and apparatus.

Description of Related Art

Human perception may naturally infer an object even if the object is not fully visible and occluded by another object. For example, when switching lanes on a highway, a person may recognize a situation by subconsciously completing occluded parts while partially looking at a following vehicle through a rearview mirror. Amodal segmentation for segmenting not only an object visible in a single image but also an object that is partially obscured may enhance an accuracy of prediction for a next frame as well as understanding of objects disposed in a scene.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a segmentation method including receiving image frames comprising a current frame and an adjacent frame to the current frame, determining a feature map to aggregate the image frames based on temporal information between the current frame and the adjacent frame, extracting a feature of a region of interest (ROI) corresponding to instances included in the current frame from the feature map, predicting a class of an object corresponding to the ROI based on the feature of the ROI, and segmenting the instances by correcting an amodal mask predicted corresponding to the class of the object based on the feature of the ROI.

The segmenting of the instances may include predicting an amodal mask corresponding to the class of the object based on the feature of the ROI, and performing the segmentation of the instances by repeatedly applying the predicted amodal mask to the feature of the ROI.

The predicting of the amodal mask may include propagating the feature of the ROI from a visible area of a target instance corresponding to the class of the object to an occluded area of the target instance and predicting the amodal mask corresponding to the target instance.

The predicting of the amodal mask may include spatially propagating the feature of the ROI by transferring a feature corresponding to the visible area through convolution layers and expanding a receptive field to the occluded area, expanding a spatial dimension of the feature of the ROI using deconvolution layers, and predicting the amodal mask corresponding to the target instance in the expanded spatial dimension.

The segmenting of the instances may include repeatedly predicting the amodal mask by spatially propagating the feature of the ROI from a visible area of a target instance corresponding to the class of object class to an occluded area of the target instance, predicting a modal mask corresponding to the visible area based on the feature of the ROI, predicting an occluded mask corresponding to the occluded area based on the feature of the ROI, and performing the segmentation of the instances based on a combination of the amodal mask, the modal mask, and the occluded mask.

The segmenting of the instances based on the combination of the amodal mask, the modal mask, and the occluded mask may include calculating a first confidence corresponding to a pixel-wise probability of the modal mask, calculating a second confidence corresponding to a pixel-wise probability of the occluded mask, weighting the amodal mask by a confidence map based on at least one of the first confidence or the second confidence, and segmentation the instances using the weighted amodal mask.

The spatially propagating of the feature of the ROI may include transferring a feature corresponding to the visible area through convolution layers to the occluded area.

The segmentation of the instances may include predicting an initial attention mask corresponding to the class of the object based on the feature of the ROI, extracting an initial mask corresponding to the class of the object from the initial attention mask, generating the amodal mask by repeatedly applying the feature of the ROI to the initial mask, and segmentation the instances using the amodal mask.

The generating of the amodal mask may include performing first masking by applying the initial mask to the feature of the ROI, predicting an attention mask corresponding to the object class based on a first masked feature generated through the first masking, performing second masking by applying the attention mask to the feature of the ROI, and generating the amodal mask based on a second masked feature generated through the second masking.

The extracting of the feature of the ROI may include extracting the feature of the ROI from the feature map using a region proposal network (RPN).

The extracting of the feature of the ROI may include selecting an instance comprising an occluded area in the current frame from among the instances, and extracting a feature of the ROI corresponding to the selected instance from the feature map using a region proposal network (RPN).

The extracting of the feature of the ROI corresponding to the selected instance may include filtering bounding boxes respectively corresponding to the instances using a cascade structure based on a non-maximum suppression (NMS) scheme, the bounding boxes comprising locations of the instances and objectness scores corresponding to the instances, and extracting the feature of the ROI corresponding to the selected instance from the feature map based on the filtered bounding boxes.

The predicting of the class of the object may include calculating scores of all object classes included in the ROI by bounding boxes respectively corresponding to the instances based on the feature of the ROI, and predicting the class of the object based on the scores of all the object classes.

The determining of the feature map may include extracting features corresponding to the image frames, spatially aligning the features with the current frame via warping between the current frame and the adjacent frame, and calculating the feature map by aggregating the aligned features.

The spatially aligning of the features may include estimating an optical flow that represents a pixel-level motion between the current frame and the adjacent frame, and spatially aligning the features with the current frame via the warping, based on the optical flow.

The segmenting the instances may include repetitively segmenting the instances by correcting the amodal mask predicted corresponding to the class of the object based on the feature of the ROI.

The adjacent frame may include a frame temporally previous to the current frame or a frame temporally following the current frame.

In another general aspect, there is provided a segmentation apparatus including a communication interface configured to receive image frames comprising a current frame and at least one adjacent frame adjacent to the current frame, and a processor configured to determine a feature map to aggregate the image frames based on temporal information between the current frame and the adjacent frame, to extract a feature of a region of interest (ROI) corresponding to instances included in the current frame from the feature map, to predict a class of an object corresponding to the ROI based on the feature of the ROI, and to segment the instances by correcting an amodal mask predicted corresponding to the class of the object based on the feature of the ROI.

The processor may be configured to predict an amodal mask corresponding to the class of the object based on the feature of the ROI, and to perform the segmentation of the instances by repeatedly applying the predicted amodal mask to the feature of the ROI.

The processor may be configured to propagate the feature of the ROI from a visible area of a target instance corresponding to the class of the object to an occluded area of the target instance, and to predict the amodal mask corresponding to the target instance.

The processor may be configured to repeatedly predict the amodal mask by spatially propagating the feature of the ROI from a visible area of a target instance corresponding to the class of the object to an occluded area of the target instance, to predict a modal mask corresponding to the visible area based on the feature of the ROI, to predict an occluded mask corresponding to the occluded area based on the feature of the ROI, and to perform the segmentation of the instances based on a combination of the amodal mask, the modal mask, and the occluded mask.

The processor may be configured to predict an initial attention mask corresponding to the class of the object based on the feature of the ROI, to extract an initial mask corresponding to the class of the object from the initial attention mask, to generate the amodal mask by repeatedly applying the feature of the ROI to the initial mask, and to segment the instances using the amodal mask.

Other features and aspects will be apparent from the following detailed description, the drawings, and the claims.

Figure 1:
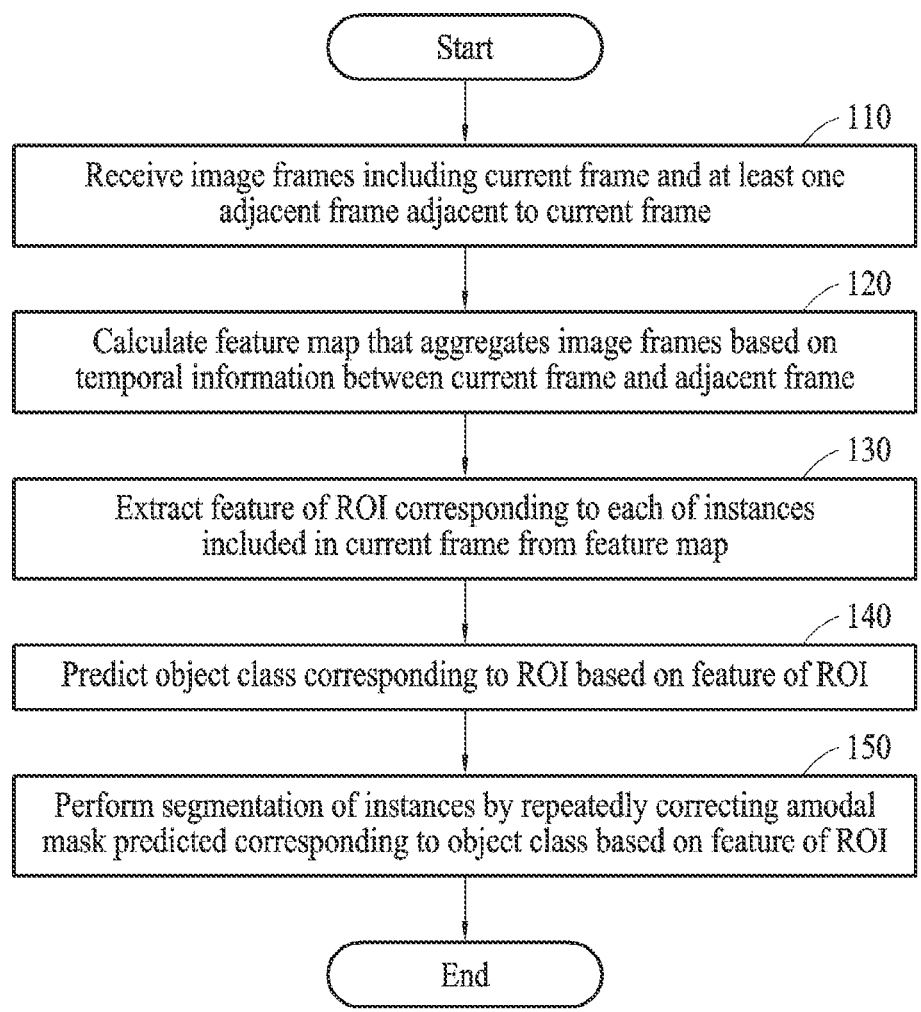
FIG. 1 illustrates an example of a segmentation method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of first, second, A, B, (a), (b), may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an example of a segmentation method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions. FIG. 1 illustrates a process in which a segmentation apparatus performs segmentation of instances included in a current frame through operations 110 to 150.

In operation 110, the segmentation apparatus may receive image frames including a current frame and at least one adjacent frame adjacent to the current frame. The at least one adjacent frame may be, for example, a previous frame adjacent to the current frame, or a next frame adjacent to the current frame. In an example, the adjacent frame comprises a frame temporally previous to the current frame or a frame temporally following the current frame. For example, when the current frame is an image frame at a time t, the adjacent frame may be an image frame at a time t−1, t−2, or t+1. Image frames may include various objects, for example, a face, a building, a vehicle, or a person, but are not limited thereto. The image frames may be received from the outside of the segmentation apparatus, or may be captured by the segmentation apparatus using an image sensor.

In operation 120, the segmentation apparatus may calculate a feature map that aggregates the image frames based on temporal information between the current frame and the adjacent frame. The temporal information may be construed as a difference between images caused by a difference in time between the current frame and the adjacent frame. The temporal information may be based on, for example, an optical flow, but is not limited thereto. The feature map may correspond to, for example, $\Phi_t$ that will be described below. To accurately extract the temporal information, the segmentation apparatus may acquire temporal information using deep-nets in various forms into which various flow-based methods are incorporated. For example, the optical flow may be used as an input of an additional deep net for video action recognition.

In operation 120, the segmentation apparatus may extract features corresponding to the image frames. The segmentation apparatus may extract features by an encoder or a neural network trained to extract features from image frames. The segmentation apparatus may spatially align features with the current frame via warping between the current frame and the adjacent frame. In an example, the segmentation apparatus may aggregate optical flows by aligning features or images to a current frame of interest via warping. An example in which the segmentation apparatus performs warping will be further described below with reference to FIGS. 3A and 3B. In an example, the segmentation apparatus may calculate a feature map through aggregation of features that are spatially aligned with the current frame. An example in which the segmentation apparatus calculates a feature map will be further described below with reference to FIG. 4.

In operation 130, the segmentation apparatus may extract a feature of a region of interest (ROI) corresponding to each of the instances included in the current frame from the feature map. For example, the segmentation apparatus may use a region proposal network (RPN) to extract the feature of the ROI from the feature map. The RPN may receive images with various sizes and may output rectangular region proposals. The RPN may retrieve a set of candidate bounding boxes corresponding to region proposals and objectness scores corresponding to the region proposals. Each object output through the RPN may represent an objectness score. The RPN may include, for example, a fully convolutional network (FCN). The RPN may share the same feature map by simultaneously obtaining an objectness score (or ROI pooling) and a region bound (or a bounding box) for each location in a grid of input data. The RPN may slide a small network over a convolution feature map that is output from a last convolution layer that shares an operation to generate region proposals. The small network may include a spatial window in n×n that receives a convolution feature map as an input. A sliding window may be mapped to lower-dimensional features through intermediate layers.

In operation 130, the segmentation apparatus may select one instance including an occluded area in the current frame from among the instances included in the current frame. The segmentation apparatus may extract a feature of a ROI corresponding to the selected instance from the feature map using an RPN. For example, the segmentation apparatus may filter bounding boxes respectively corresponding to the instances using a cascade structure that is based on a non-maximum suppression (NMS) scheme. In this example, the bounding boxes may include any one or any combination of identification information indicating an instance corresponding to each of the bounding boxes, locations of the instances, and objectness scores corresponding to the instances. In the NMS scheme, when all proposals are aligned based on intersection of union (IoU) values, a process of comparing overlapping for a proposal with a highest ROI score and other proposals and of removing overlapping proposals if the overlapping proposals are greater than or equal to a threshold may be repeated, and a plurality of overlapping output results for the same target may be deleted. The IoU values may correspond to a result obtained by dividing an area of overlap into areas of union. The segmentation apparatus may extract a feature of a ROI corresponding to the selected instance from the feature map, based on the filtered bounding boxes. In other words, the segmentation apparatus may extract the feature of the ROI corresponding to the selected instance from the feature map, based on a bounding box that is finally left through the filtering.

In operation 140, the segmentation apparatus may predict an object class corresponding to the ROI based on the feature of the ROI extracted in operation 130. The segmentation apparatus may calculate scores of all object classes included in the ROI by the bounding boxes respectively corresponding to the instances, based on the feature of the ROI. The segmentation apparatus may predict the object class based on the scores of the object classes. The scores of the object classes may be class information corresponding to features of an object level, that is, values indicating probabilities of a corresponding object being a corresponding class. The segmentation apparatus may predict an object class with a highest score among the scores of the object classes as the object class corresponding to the ROI.

In operation 150, the segmentation apparatus may perform segmentation of the instances by repeatedly correcting an amodal mask predicted corresponding to the object class based on the feature of the ROI extracted in operation 130. The segmentation may correspond to, for example, instance segmentation based on a mask-regions with CNN (RCNN). The instance segmentation may be construed to be classifying all types of instances corresponding to a ROI and performing segmentation of the instances.

In operation 150, the segmentation apparatus may predict an amodal mask corresponding to the object class based on the feature of the ROI. The amodal mask may correspond to a segmentation mask of an instance including both a visible area and an occluded area. The amodal mask may correspond to, for example, a binary mask in which "1" indicates a pixel location corresponding to an instance and "0" indicates a pixel location that does not correspond to an instance.

The segmentation apparatus may predict an amodal mask corresponding to a target instance corresponding to an object class by propagating the feature of the ROI from a visible area of the target instance to an occluded area of the target instance.

For example, the segmentation apparatus may spatially propagate the feature of the ROI by transferring a feature corresponding to the visible area through convolution layers and by expanding a receptive field to the occluded area. An example in which the segmentation apparatus spatially propagates the feature of the ROI will be further described below with reference to FIG. 6. The segmentation apparatus may expand a spatial dimension of a feature of a ROI to a size of 28×28 represented by $\Psi^{(0)}$ as shown in FIG. 7 below, using deconvolution layers. The segmentation apparatus may predict the amodal mask corresponding to the target instance in the expanded spatial dimension. The segmentation apparatus may perform the segmentation of the instances by repeatedly performing an operation of applying the predicted amodal mask to the feature of the ROI. An example in which the segmentation apparatus predicts the amodal mask and performs the segmentation of the instances by repeatedly performing the operation of applying the predicted amodal mask to the feature of the ROI will be further described below with reference to FIG. 7.

Depending on examples, the segmentation apparatus may perform segmentation of instances in operation 150, through the following process.

The segmentation apparatus may spatially propagate the feature of the ROI from a visible area of a target instance corresponding to the object class to an occluded area of the target instance and may repeatedly predict the amodal mask. The segmentation apparatus may predict a modal mask corresponding to the visible area, based on the feature of the ROI. The segmentation apparatus may predict an occluded mask corresponding to the occluded area, based on the feature of the ROI. The segmentation apparatus may perform segmentation of the instances based on a combination of the amodal mask, the modal mask, and the occluded mask. The segmentation apparatus may calculate a first confidence corresponding to a pixel-wise probability of the modal mask. The segmentation apparatus may calculate a second confidence corresponding to a pixel-wise probability of the occluded mask. The segmentation apparatus may weight the amodal mask by a confidence map that is based on at least one of the first confidence and the second confidence. Two examples of utilizing the first confidence and the second confidence used for weighting are described below.

In an example, the segmentation apparatus may multiply at least one of the first confidence and the second confidence by an amodal mask result, to weight the amodal mask.

In another example, the segmentation apparatus may utilize at least one of the first confidence and the second confidence as an additional input of an "iterative mask-head with a large receptive field and self-attention" used for prediction of the amodal mask, to weight the amodal mask.

The segmentation apparatus may perform segmentation of instances by the amodal mask weighted by the above-described schemes.

Figure 2:
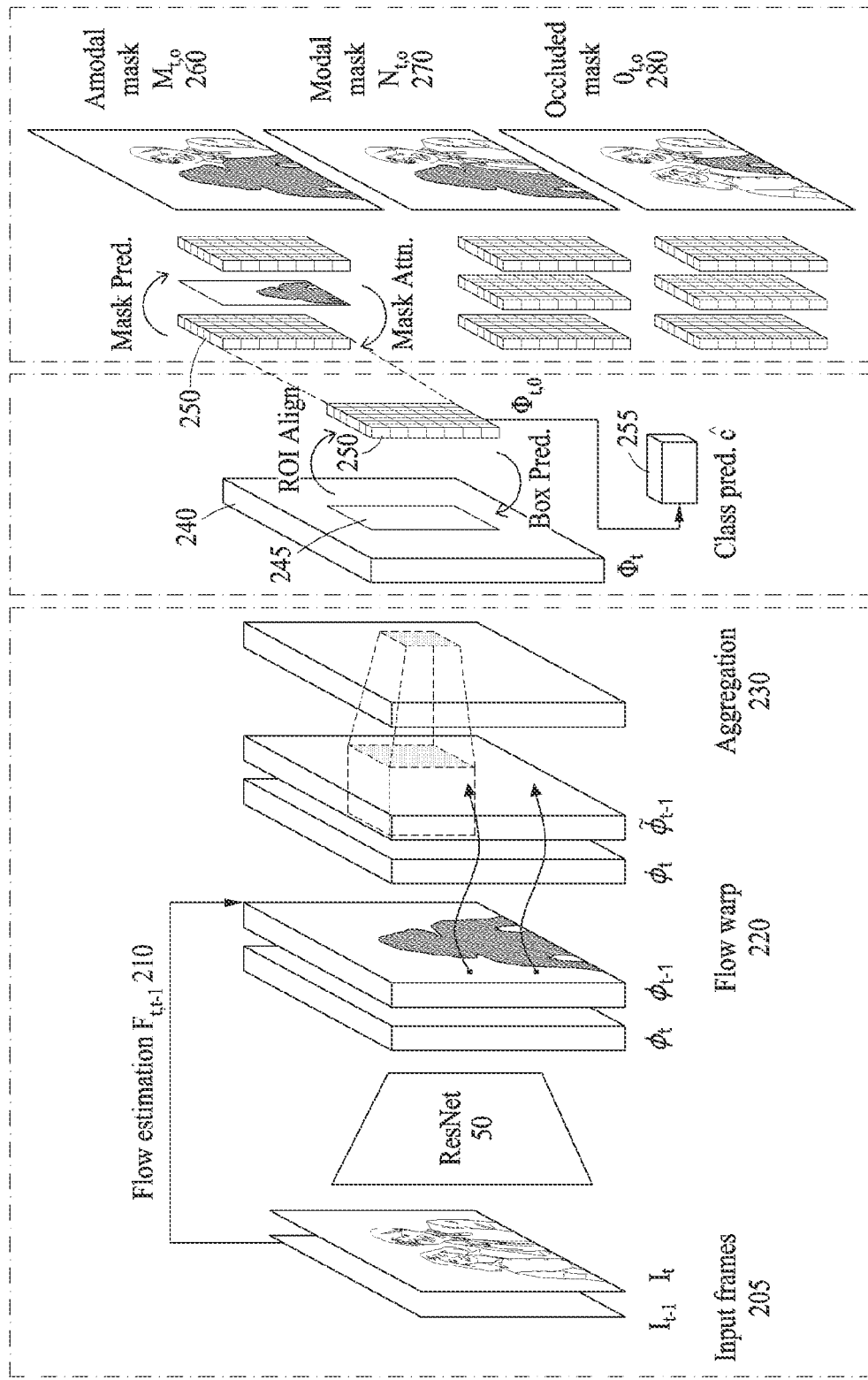
FIG. 2 illustrates an example of a framework of a segmentation apparatus.

FIG. 2 illustrates an example of a framework of a segmentation apparatus. FIG. 2 illustrates a framework of a segmentation apparatus that predicts an amodal mask 260, a modal mask 270, and an occluded mask 280 from input image frames 205 and that performs segmentation of instances based on a combination of the amodal mask 260, the modal mask 270, and the occluded mask 280.

The segmentation apparatus may be an apparatus for performing segmentation of instance level video objects, and may delineate an object and an occluded part of the object in video data.

For example, when a series of image frames $I_{t-T:t}=(I_{t-T+1}, \ldots, I_t)$ 205 are input, the segmentation apparatus may predict an amodal mask $M_{t,o}$ 260 for all object (or all instances) in a current frame $I_t$. In this example, the amodal mask $M_{t,o}$ 260 may be an amodal mask for an instance o∈$\mathcal{O}_t$ in a frame $t^{th}$, and $\mathcal{O}_t$ may correspond to a set of instances detected in the current frame $I_t$. In the following description, the terms "object" and "instance" may be interchangeably used with respect to each other.

The segmentation apparatus may extract features of all image frames in $I_{t:t-T}$. For example, the segmentation apparatus may extract the features of all the image frames using a backbone network, for example, a residual neural network (ResNet).

The segmentation apparatus may estimate an optical flow $F_{t,t-1}$ in operation 210, and may spatially align a feature $\phi_{t-1}$ corresponding to a previous frame and a feature $\phi_t$ corresponding to the current frame $I_t$ via flow warping 220.

The segmentation apparatus may perform aggregation 230 of the aligned features and may calculate a feature map $\Phi_t$ 240. For example, the segmentation apparatus may aggregate features across frames by two-dimensional (2D) convolution and/or three-dimensional (3D) convolution.

For example, the segmentation apparatus may perform spatial and temporal aggregation to calculate the feature map $\Phi_t$ 240. In this example, the feature map $\Phi_t$ 240 may include temporal information between a current frame and a frame adjacent to the current frame.

The segmentation apparatus may utilize the temporal information across images frames based on the above-described process. The segmentation apparatus may incorporate the temporal information into a backbone that predicts an amodal mask, to infer an occluded area based on the current frame and the adjacent frame.

The segmentation apparatus may detect the feature map $\Phi_t$ 240 and may extract, from a ROI 245 corresponding to each of instances in the feature map $\Phi_t$ 240, a feature $\Phi_{t,o}$ 250 of the ROI 245 corresponding to a target instance. For example, the segmentation apparatus may extract the feature $\Phi_{t,o}$ 250 of the ROI 245 from the feature map $\Phi_t$ 240 by an RPN. In this example, the feature $\Phi_{t,o}$ 250 of the ROI 245 may correspond to object-level features for each instance $o \supset \mathcal{O}_t$.

When a candidate bounding box corresponding to the ROI 245 is provided, the segmentation apparatus may extract a feature map for the candidate bounding box using a ROI-Align. Features of bounding boxes may be subsequently processed by a box-head and/or a mask-head, which may regress to bounding boxes and segmentation masks, respectively. The box-head may include fully connected layers. The segmentation apparatus may perform a classification prediction and may calculate a size and a location of a bounding box, using the box-head. The mask-head may include a stack of convolution layers that generate a 28×28 class-specific mask.

The segmentation apparatus may prevent overlapping of bounding boxes for segmentation of an amodal mask, using a cascaded box-head that is based on a soft-NMS scheme.

Bounding boxes corresponding to an amodal mask for amodal instance segmentation may overlap more significantly than bounding boxes corresponding to a modal mask for modal instance segmentation. The segmentation apparatus may prevent overlapping of bounding boxes by more broadly propagating a feature of a ROI. To more broadly propagate information of each of instances to an occluded area, the segmentation apparatus may use a mask-head with a large receptive field and self-attention.

The segmentation apparatus may predict an object class ĉ 255 corresponding to the ROI 245 based on the feature $\Phi_{t,o}$ 250 of the ROI 245. The box-head may process overlapping bounding boxes using soft-thresholding during NMS.

When the feature $\Phi_{t,o}$ 250 of the ROI 245 is given, the segmentation apparatus may predict the amodal mask $M_{t,o}$ 260 for each object using an iterative mask-head described in Table 1 below. In this example, the segmentation apparatus may use an iterative mask-head with a large receptive field and self-attention. Thus, a feature of a ROI may be propagated anywhere during mask prediction. The segmentation apparatus may repeatedly predict the amodal mask $M_{t,o}$ 260 by spatially propagating the feature of the ROI from a visible area of a target instance corresponding to the object class ĉ 255 to an occluded area of the target instance.

The segmentation apparatus may predict the modal mask $N_{t,o}$ 270 corresponding to the visible area, based on the feature $\Phi_{t,o}$ 250 of the ROI 245. The segmentation apparatus may predict the occluded mask $0_{t,o}$ 280 corresponding to the occluded area, based on the feature $\Phi_{t,o}$ 250 of the ROI 245.

The segmentation apparatus may perform segmentation of instances based on a combination of the amodal mask $M_{t,o}$ 260, the modal mask $N_{t,o}$ 270, and the occluded mask $0_{t,o}$ 280. The segmentation apparatus may calculate a first confidence (or an objectness score) corresponding to a pixel-wise probability of the modal mask $N_{t,o}$ 270. The segmentation apparatus may calculate a second confidence (or an objectness score) corresponding to a pixel-wise probability of the occluded mask to $0_{t,o}$ 280. The segmentation apparatus may weight the amodal mask $M_{t,o}$ 260 by a confidence map that is based on at least one of the first confidence and the second confidence. The segmentation apparatus may perform segmentation of instances using the weighted amodal mask $M_{t,o}$ 260.

In an example, the segmentation apparatus may train the modal mask $N_{t,o}$ 270 and the occluded mask $0_{t,o}$ 280 together with the amodal mask $M_{t,o}$ 260. The segmentation apparatus may use a standard mask-RCNN mask-head to train each mask. For example, the segmentation apparatus may sum negative log-likelihoods as shown in Equation 1 below.

$$-\sum_{t,o} \log(p_\theta(M_{t,o}^* | \Phi_{t,o}) \cdot p_\theta(N_{t,o}^* | \Phi_{t,o}) \cdot p_\theta(O_{t,o}^* | \Phi_{t,o})), \quad \text{[Equation 1]}$$

In Equation 1, $p_\theta(M_{t,o}^*|\Phi_{t,o}^*)$, $p_\theta(N_{t,o}^*|\Phi_{t,o}^*)$, and $p_\theta(O_{t,o}^*|\Phi_{t,o}^*)$ may correspond to distribution of the amodal mask $M_{t,o}$ 260, the modal mask $N_{t,o}$ 270, and the occluded mask $0_{t,o}$ 280, respectively. Also, * may indicate ground-truth masks corresponding to each mask.

Locations of pixels in each mask may be modeled to be independent and to follow a Bernoulli distribution. An overall loss function may be summed over a training set and may include a loss caused by box regression and classification by Mask-RCNN. The segmentation apparatus may apply label-smoothing to bounding box classification of the amodal mask $M_{t,o}$ 260, to enhance an accuracy.

Figure 3A:
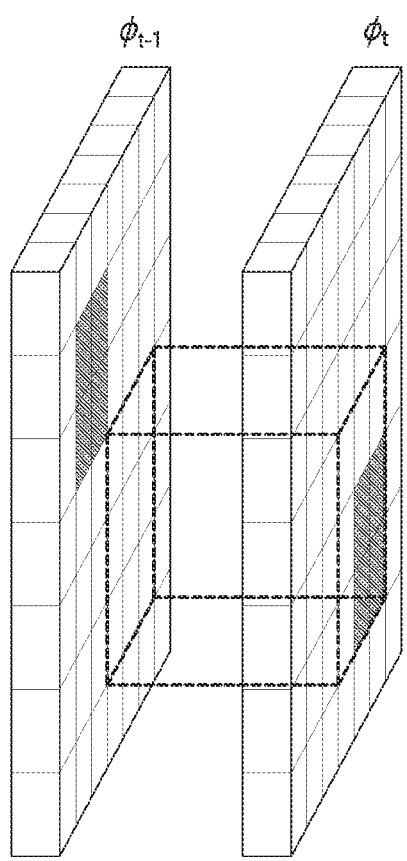
FIGS. 3A and 3B illustrate examples of warping.
Figure 3B:
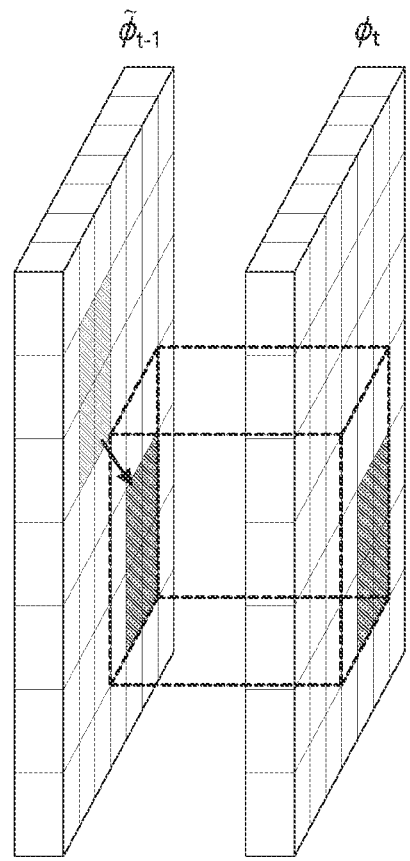

FIGS. 3A and 3B illustrate examples of warping. FIG. 3A illustrates a result in which features of two image frames are not aligned due to a motion. FIG. 3B illustrates a result in which features of two image frames are spatially aligned. In FIGS. 3A and 3B, darker hatched portions across the two frames may correspond to the same objects or the same instances.

To capture temporal information for prediction of an amodal mask, a segmentation apparatus may use a temporal backbone that aggregates features over time. The temporal backbone may be used to extract features using inputs of a plurality of frames.

For example, the segmentation apparatus may align features using an optical flow that represents a pixel level motion between a current frame and an adjacent frame, and may aggregate all features in coordinates of the current frame. The segmentation apparatus may estimate the optical flow, and may spatially align extracted features with the current frame via warping, based on the estimated optical flow.

FIG. 3A illustrates a situation in which an object indicated by a hatched portion moves from a previous frame towards a lower right end of a current frame. Intuitively, features of the object may need to be located at a location of the current frame during prediction of a mask. However, when the object moves, features of the object may not be correctly aggregated over time, as shown in FIG. 3A.

The segmentation apparatus may warp the previous frame to the current frame using an optical flow that aligns an object of the previous frame to the current frame, to correctly aggregate features of the object in the current frame even though the object moves, as shown in FIG. 3B.

A process (flow alignment) by which the segmentation apparatus spatially aligns features with a current frame will be described below.

For example, when a current frame $I_t$ and a previous frame $I_{t-1}$ are input, the segmentation apparatus may estimate an optical flow $F_{t,t-1}: \mathbb{R}^2 \mapsto \mathbb{R}^2$ that represents a pixel level motion between the two input frames. When a pixel located at $u=(u_x, u_y)$ in the current frame $I_t$ is given, a corresponding location $v=(v_x, v_y)$ of the same pixel in the previous frame $I_{t-1}$ may be present. In this example, the optical flow may correspond to relative offset between locations of the two pixels, as shown in Equation 2 below.

$$F_{t,t-1}(u)=(u_x-v_x, u_y-v_y)$$ [Equation 2]

The segmentation apparatus may use the optical flow to spatially align features of each frame via warping. For example, the segmentation apparatus may use a ResNet backbone to extract features of the current frame $I_t$ and the previous frame $I_{t-1}$ based on $\phi_t, \phi_{t-1} \in \mathbb{R}^{H \times W \times C}$. In this example, H, W, and C denote a height, a width, and a number of feature channels, respectively. The segmentation apparatus may warp features $\phi_{t-1}$ using a bilinear kernel to perform differentiable sampling across all channels. Since the optical flow is a continuous estimate that does not match a location of an integer grid, the segmentation apparatus may aggregate features through a bilinear interpolation on four neighboring points.

For example, the segmentation apparatus may obtain a warped feature $\tilde{\phi}_{t-1}$ Equation 3 shown below. Equation 3 may correspond to an equation to perform a bilinear interpolation.

$$\tilde{\phi}_{t-1}(u) = \sum_{\hat{u} \in C_{\tilde{u}(u)}} (1-|\tilde{u}_x(u)-\hat{u}_x|)(1-|\tilde{u}_y(u)-\hat{u}_y|)\phi_{t'}(\hat{u})$$ [Equation 3]

In Equation 3, $\tilde{\phi}_{t-1}$ denotes a warped feature at a time t−1, and $\tilde{\phi}_{t-1}(u)$ denotes a feature value in a floating point or an integer point u. Also, $\phi_{t'}$ denotes a reference feature at a time t, and $\phi_{t'}(\hat{u})$ denotes a feature value at $\hat{u}$ that is an integer.

$\hat{u}$ may be points with floating points or integers, and the segmentation apparatus may not directly fetch a corresponding value from a feature $\phi_{t'}$ before warping. This is because feature values before warping are present in the integer grid only. Thus, the segmentation apparatus may calculate a value of the warped feature $\tilde{\phi}_{t-1}$ through a bilinear interpolation on four points adjacent to $\hat{u}$ in the feature $\phi_{t'}$ before warping.

$\hat{u}(u)=u-F_{t,t-1}(u)$ and $c_{\hat{u}}(u)$ may be a set of four points, for example, a top left point, a top right point, a bottom left point, and a bottom right point, closest to $\tilde{u}(u)$ in the integer grid. Here, an integral point in an upper left end of $\tilde{u}$ may be $(\lfloor \tilde{u}_x \rfloor, \lfloor \tilde{u}_y \rfloor)$. The segmentation apparatus may warp spatial locations of $\phi_{t-1}$ according to a motion given by $F_{t,t-1}$.

For example, $\hat{u}=(2.3, 3.5)$ may be assumed. In this example, $c_{\hat{u}}(u)$ may correspond to points that are integers close to $\tilde{u}$. In other words, $c_{\hat{u}}(u)$ may correspond to a set including (2, 3), (3, 3), (2, 4), and (3, 4). Thus, during estimation of a feature value of (2.3, 3.5), the segmentation apparatus may perform a weighted sum of feature values of the four points. In Equation 3, $(1-|\tilde{u}_x(u)-\hat{u}_x|)(1-|\tilde{u}_y(u)-\hat{u}_y|)$ may be a weight during the bilinear interpolation.

Figure 4:
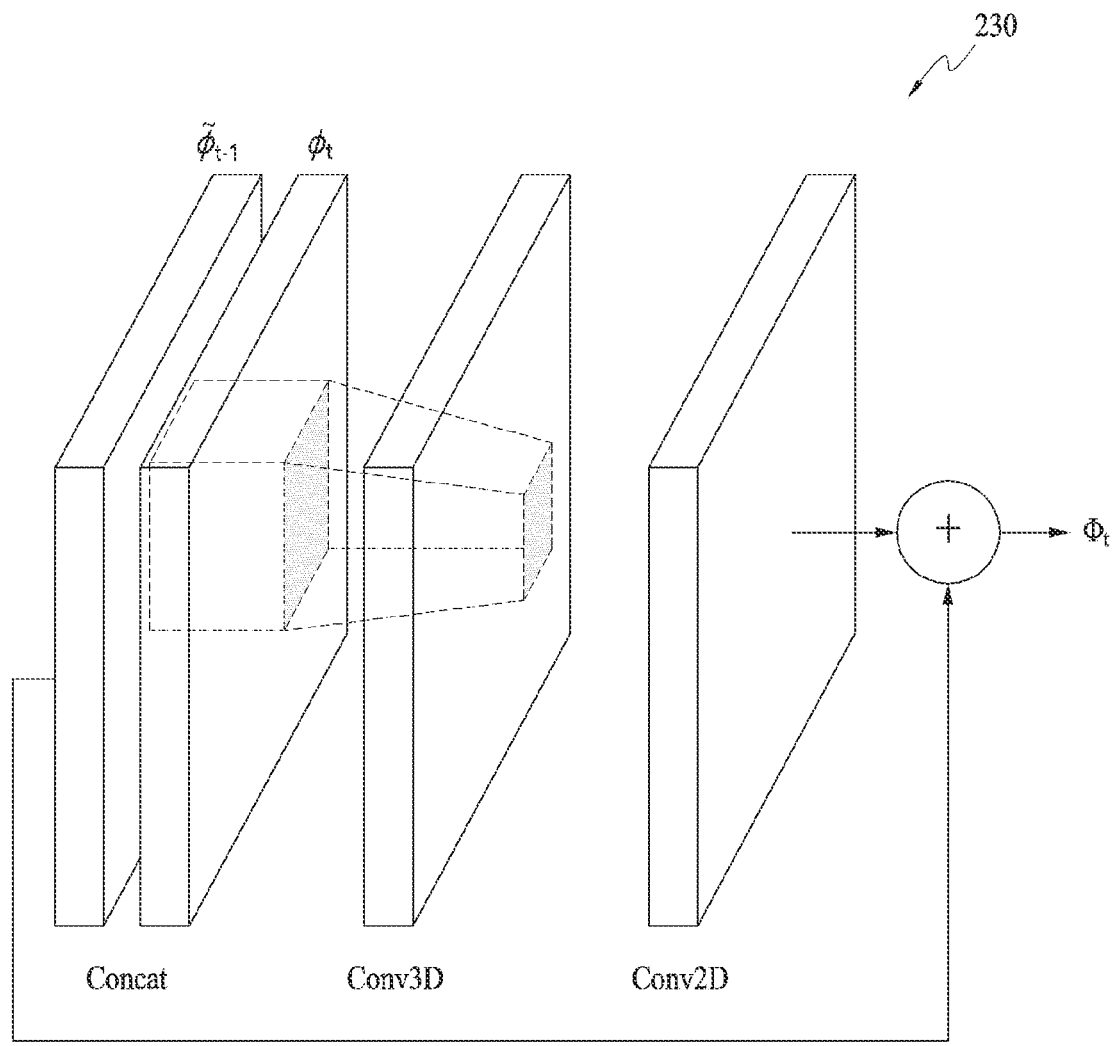
FIG. 4 illustrates an example of calculating a feature map.

FIG. 4 illustrates an example of calculating a feature map. FIG. 4 illustrates a process by which a segmentation apparatus spatially and temporally aggregates features through a Conv3D layer, a Conv2D layer, and a skip-connection.

When an object moves, it may be difficult to correctly aggregate features of the object over time. The segmentation apparatus may warp a previous frame to a current frame using an optical flow that aligns an object of the previous frame to the current frame as described above with reference to FIG. 3B, to correctly aggregate features of the object and calculate a feature map even though the object moves.

The segmentation apparatus may concatenate and aggregate a warped feature $\tilde{\phi}_{t-1}$ and a feature $\phi_t$ across a time dimension, to generate a feature map $\Phi_t$. For example, the feature map $\Phi_t$ may be calculated using Equations 4 and 5 shown below.

$$\phi_{t:t-1} = \text{Concat}(\phi_t, \tilde{\phi}_{t-1}, \ldots) \in \mathbb{R}^{T \times H \times W \times C}$$ [Equation 4]

$$\Phi_t = \text{Aggregation}(\phi_{t:t-1}) \in \mathbb{R}^{H \times W \times C}$$ [Equation 5]

When the feature map $\Phi_t$ is calculated, the segmentation apparatus may share the feature map $\Phi_t$ with a box-head and mask-heads, to predict a bounding box and a corresponding amodal mask.

Figure 5:
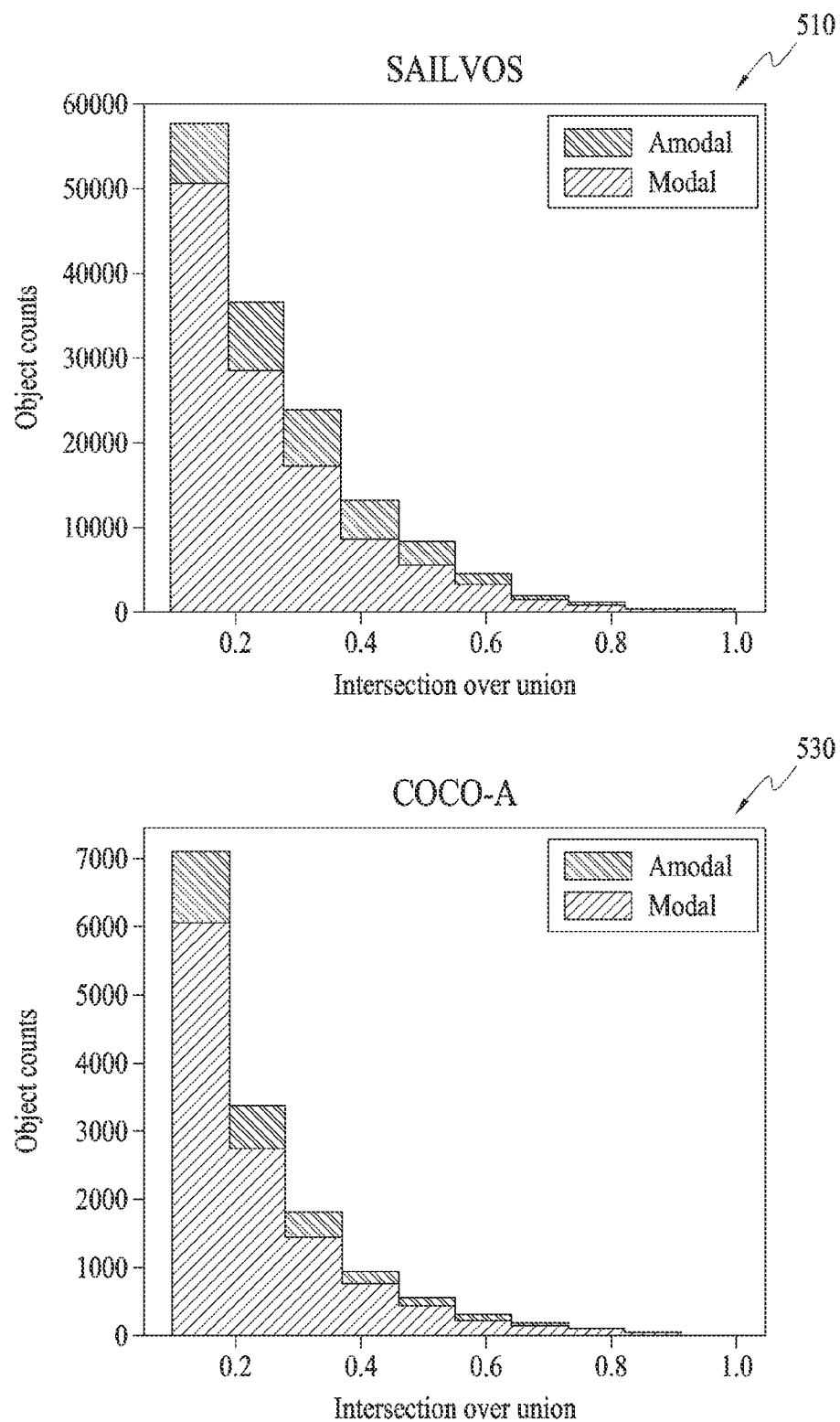
FIG. 5 illustrates examples of a histogram of an intersection over union (IoU) for a bounding box for modal segmentation and a bounding box for amodal segmentation.

FIG. 5 illustrates examples of a histogram of an intersection over union (IoU) for a bounding box for modal segmentation and a bounding box for amodal segmentation. A histogram 510 shows an IoU of a bounding box for each of a modal mask and an amodal mask using a semantic amodal instance level video object segmentation (SAIL-VOS) training set. A histogram 530 shows an IoU of a bounding box for each of a modal mask and an amodal mask using a COCO-A training set.

In an example, when a portion of an image is occluded, it may be difficult to predict a bounding box for an amodal mask, because a shape and a size of an object need to be inferred in a state in which the occluded portion is present. In another example, when a significant portion of an image frame is occluded, the segmentation apparatus may incorrectly remove a suitable bounding box candidate due to NMS.

The segmentation apparatus may filter bounding boxes (bounding box candidates) respectively corresponding to instances using a cascade structure that is based on an NMS scheme, to successively refine an initial inaccurate prediction of an amodal mask. Unlike modal setting, a ground-truth of a bounding box of an amodal mask may more frequently overlap bounding boxes representing other objects.

When the feature map $\Phi_t$ is given, the segmentation apparatus may successively refine a feature of a ROI corresponding to each of instances included in a current frame in a series of L stages $l \in \{1, \ldots, L\}$ of a cascade structure.

For example, the segmentation apparatus may apply ROI Align to a set of object candidates $\mathcal{O}_t^{(l)}$ at each of the stages l, and may spatially crop features $\Phi_{t,o}^{(l)}$ of a ROI associated with an object. In this example, the ROI Align may be construed to a process of matching sizes of bounding boxes corresponding to a ROI including location information through a linear interpolation because location information of an input image may be distorted when bounding boxes are moved to neighboring pixels for detection of an object.

The segmentation apparatus may predict a new bounding box from a feature $\Phi_{t,o}$ of each ROI using a box-regressor $f$. The bounding box may include an objectness score $\hat{s}$ and a location $\hat{b}$ corresponding to a corresponding ROI. The segmentation apparatus may filter a set of the predicted bounding box and objectness scores based on Soft-NMS to prepare $\mathcal{O}_t^{(l+1)}$ that is to be used in a next stage.

For example, when $\Phi_t$ and $\mathcal{O}_t^{(l)}$ are given at a stage l of a cascade structure, the segmentation apparatus may calculate Equations 6 to 8 shown below.

$$\Phi_{t,o}^{(l)} = \text{ROIAlign}(\Phi_t, o) \forall o \in \mathcal{O}_t^{(l)}$$ [Equation 6]

$$(\hat{b}_{t,o}, \hat{s}_{t,o}) = f^{(l)}(\Phi_{t,o}^{(l)}) \forall o \in \mathcal{O}_t^{(l)}$$ [Equation 7]

$$\mathcal{O}_t^{(l+1)} = \text{Soft-NMS}(\{(\hat{b}_{t,o}, \hat{s}_{t,o}) \forall o \in \mathcal{O}_t^{(l)}\}).$$ [Equation 8]

The segmentation apparatus may use an object candidate set $\mathcal{O}_t$ to refer to a final set of detected objects, that is, $\mathcal{O}_t = \mathcal{O}_t^{(L)}$.

To obtain $\mathcal{O}_t^{(l)}$, the segmentation apparatus may use an RPN to estimate a set of initial object candidates. When the object candidate set $\mathcal{O}_t$ is given, the segmentation apparatus may predict a final set of amodal segmentations $\mathcal{M}$.

Figure 6:
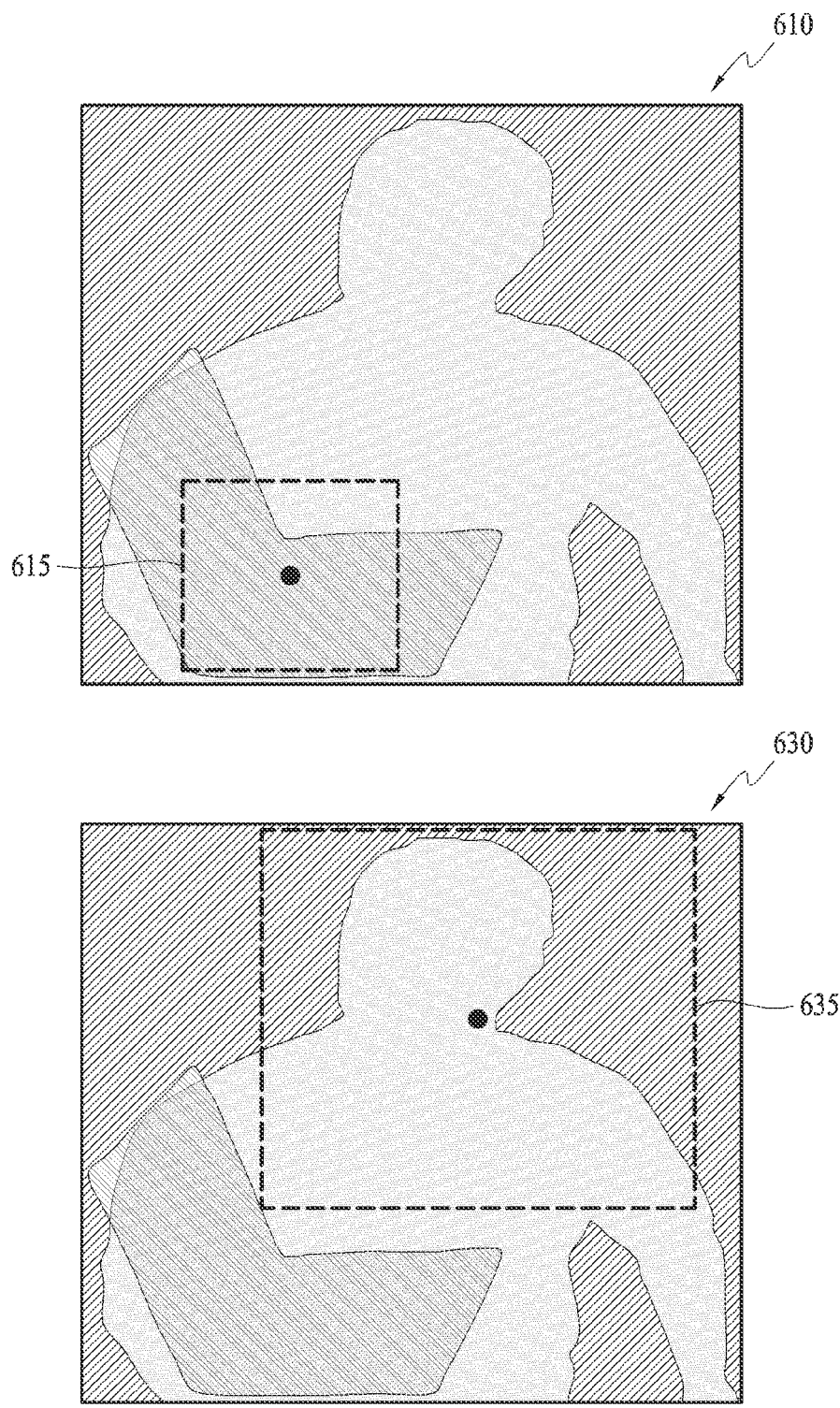
FIG. 6 illustrates an example of spatially propagating a feature of a region of interest (ROI) by expanding a reception field.
Figure 7:
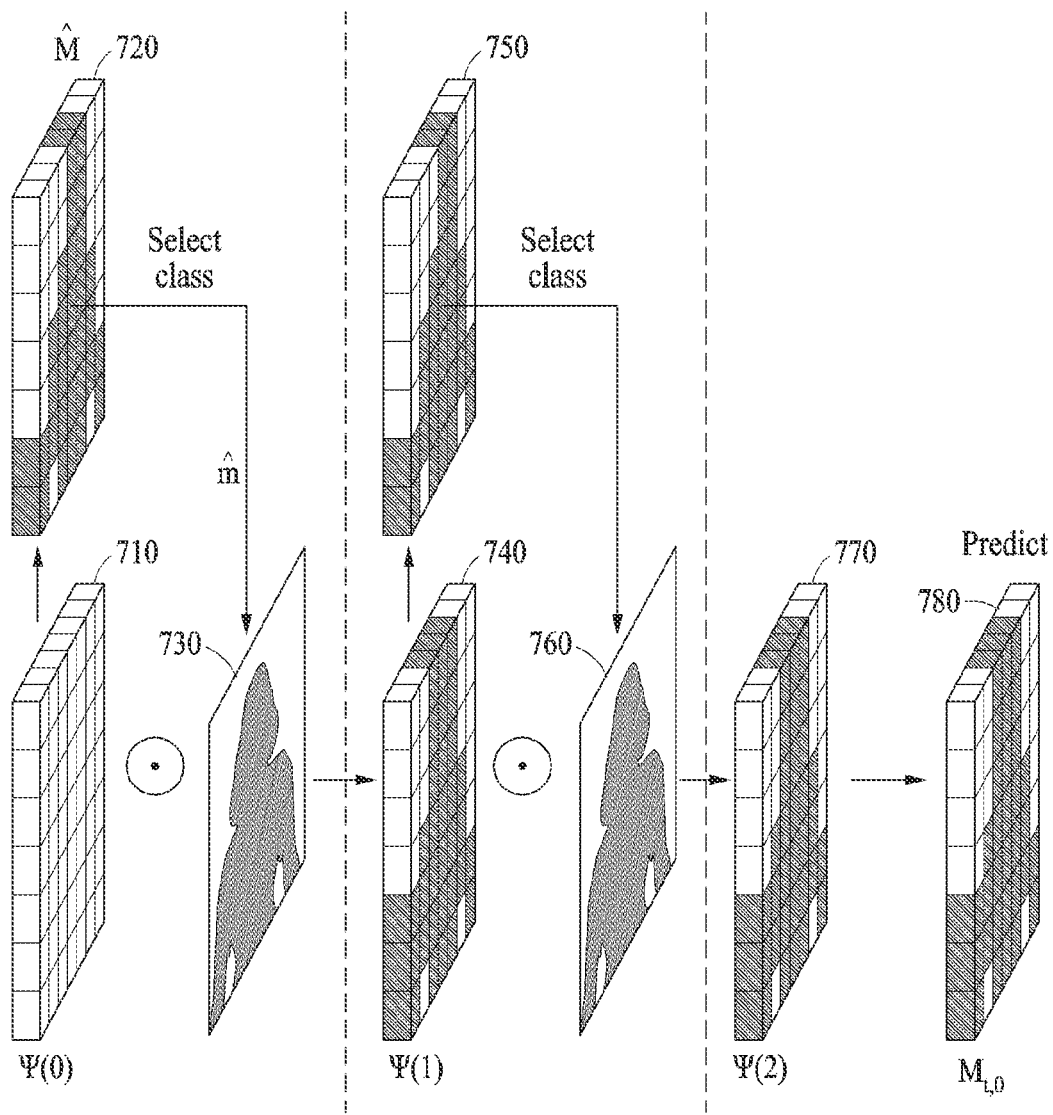
FIG. 7 illustrates an example of repeatedly correcting an amodal mask predicted corresponding to an object class.

FIG. 6 illustrates an example of spatially propagating a feature of a ROI by expanding a reception field. In FIG. 6, a box 610 shows an example in which a large amount of information about a person in an occluded area is not secured by a receptive field 615 that is small in size, and a box 630 shows an example in which a large amount of information about a background area in addition to the information about the person are secured by a receptive field 635 that is expanded.

Since the size of the receptive field 615 is small, local information corresponding to a portion of an image may be accommodated. When the receptive field 615 includes an occluded area, there is not much information about the person that may be received through the receptive field 615.

Unlike the receptive field 615, the receptive field 635 may receive information about a large number of areas of an image because the receptive field 635 is large in size. In other words, when the receptive field 635 is large in size, features may be aggregated over a large number of background areas in addition to a person corresponding to a target instance or an object of interest. The segmentation apparatus may aggregate features of a larger number of areas by the expanded receptive field 635 while focusing on a feature of a ROI corresponding to a corresponding instance through self-attention, to predict an amodal mask.

For a prediction of an amodal mask, the segmentation apparatus may spatially propagate features from a visible area of an object of interest (for example, a user) to an occluded area (for example, an area occluded by a book of FIG. 6) while ignoring the occluded area. The segmentation apparatus may allow features of a background to be gradually ignored through self-attention by an iterative mask-head. The iterative mask-head may correspond to an amodal mask corresponding to an object class predicted based on a feature of a ROI.

For example, the segmentation apparatus may predict an amodal mask by focusing on a target instance included in an image through an iterative mask-head that operates as a module 1 described in Table 1 below.

TABLE 1

Module 1: IterativeMaskHead($\Phi_{t,o}$)

Input: feature $\Phi_t$, object o; $L_1, L_2 \in \mathbb{Z}^+$
$\Phi_{t,o}$ = ROIAlign ($\Phi_{t,o}$)
Iterations of Conv2D:
$\psi^{(o)} = \Phi_{t,o}$
for $l \in [1, \ldots, L_1]$ do
 | $\psi^{(l)}$ = Relu(Conv2D($\psi^{(l-1)}$))
end
Iterations of AttentionFeat:
$\Psi^{(o)}$ = Deconv($\psi^{(L1)}$)
for $\ell \in [1, \ldots, L_2]$ do
 | $\Psi^{(\ell)}$ = AttentionFeat($\Psi^{(\ell-1)}$, o)
end
Return: Conv2D($\Phi^{(L2)}$)

When a feature map $\Phi_t$ and an object candidate $o \in \mathcal{O}_t$ are calculated, the segmentation apparatus may output a corresponding amodal mask $M_{t,o}$. In an example, the segmentation apparatus may crop a feature $\Phi_{t,o}$ of a ROI using the above-described ROI Align. The feature $\Phi_{t,o}$ of the ROI may correspond to a feature of an object level.

In an example, the segmentation apparatus may transfer the feature $\Phi_{t,o}$ of the ROI through, for example, nine convolution layers, to allow a receptive field to cover an entire input with a spatial size of 14×14. The segmentation apparatus may expand the receptive field to an occluded area by transferring a feature corresponding to a visible area through convolution layers, to spatially propagate the feature $\Phi_{t,o}$ of the ROI.

In an example, the segmentation apparatus may convert a spatial dimension of the feature $\Phi_{t,o}$ of the ROI with a spatial size of 14×14 into a feature $\psi(0)$ of the ROI with an expanded space size of 28×28, using deconvolution layers.

FIG. 7 illustrates an example of repeatedly correcting an amodal mask predicted corresponding to an object class. FIG. 7 illustrates a process by which a segmentation apparatus repeatedly corrects a predicted amodal mask based on a feature $\psi(0)$ 710 of a ROI with an expanded space size of 28×28. For example, the segmentation apparatus may correct the predicted amodal mask through 3 iterations, and may set L2=3 in module 1 described in Table 1 above.

The segmentation apparatus may predict an initial attention mask $\hat{M}$ 720 corresponding to an object class based on the feature $\psi(0)$ 710 of the ROI. The initial attention mask $\hat{M}$ 720 may correspond to an amodal attention mask corresponding to all channels corresponding to features of the ROI.

The segmentation apparatus may extract an initial mask $\hat{m}$ 730 corresponding to the object class from the initial attention mask $\hat{M}$ 720.

The segmentation apparatus may generate an amodal mask by repeatedly applying the feature $\psi(0)$ 710 of the ROI to the initial mask $\hat{m}$ 730.

For example, the segmentation apparatus may perform first masking by applying the initial mask $\hat{m}$ 730 to the feature $\psi(0)$ 710 of the ROI, to generate a first masked feature $\psi(1)$ 740.

The segmentation apparatus may predict an attention mask 750 corresponding to the object class based on the first masked feature $\psi(1)$ 740. The segmentation apparatus may generate the attention mask 750 through convolution and sigmoid operations of the first masked feature $\psi(1)$ 740. The segmentation apparatus may extract a mask 760 corresponding to the object class from the attention mask 750.

The segmentation apparatus may perform second masking by applying the mask 760 to the feature $\psi(0)$ 710 of the ROI, to generate a second masked feature $\psi(2)$ 770. The segmentation apparatus may generate an amodal mask $M_{t,o}$ 780 based on the second masked feature $\psi(2)$ 770. The segmentation apparatus may perform segmentation of instances using the amodal mask $M_{t,o}$ 780.

The above-described process may be expressed as an operation of a module 2 described in Table 2 below.

TABLE 2

Module 2: AttentionFeat($\psi^{(\ell)}$, o)

Input: feature $\psi^{(\ell)}$ and object o = (s, b)
Predict Class: $\hat{c}$ = arg max$_k$ s[k]
Predict Mask: $\hat{M}$ = σ(Conv2D($\psi^{(\ell)}$))
Select Class: $\hat{m} = \hat{M}[\hat{c}]$
Return: Relu(Conv2D($\psi^{(\ell)}$) ⊙ $\hat{m}$)

TABLE 2-continued

Module 2: AttentionFeat($\Psi^{(\ell)}$, o)

Input: feature $\Psi^{(\ell)}$ and object o = (s, b)
Predict Class: $\hat{c}$ = arg max$_k$ s[k]
Predict Mask: $\hat{M}$ = $\sigma$(Conv2D($\Psi^{(\ell)}$))
Select Class: $\hat{m}$ = $\hat{M}[\hat{c}]$
Return: Relu(Conv2D($\Psi^{(\ell)}$) $\odot$ $\hat{m}$)

For example, the segmentation apparatus may be assumed to obtain bounding boxes including sizes b and scores s of all classes included in a ROI and a feature $\Psi^{(\ell)}$ of the ROI at each level $\ell$ of a cascade structure.

In this example, the segmentation apparatus may predict an object class $\hat{c}$ based on the scores s of all the classes included in the ROI by bounding boxes respectively corresponding to instances. The segmentation apparatus may predict the object class $\hat{c}$ based on a score s of a corresponding object. In table 2, s[k] may correspond to a score s of a class k.

The segmentation apparatus may predict the amodal attention mask $\hat{M}$ 720 and the attention mask 750 for all object classes, using the feature $\Psi^{(\ell)}$ 710, the first masked feature $\psi(1)$ 740, and the second masked feature $\psi(2)$ 770. The segmentation apparatus may perform an element-wise multiplication $\odot$ between an attention channel for the predicted object class $\hat{c}$, i.e., $\hat{M}[\hat{c}]$ and the feature $\Psi^{(\ell)}$ 710, the first masked feature $\psi(1)$ 740, and the second masked feature $\psi(2)$ 770. Through the element-wise multiplication, a feature of a background included in an image frame may gradually become zero, and a feature of an object corresponding to a target instance may be emphasized.

The segmentation apparatus may generate the amodal mask $M_{t,o}$ 780 using a convolution layer.

Figure 8:
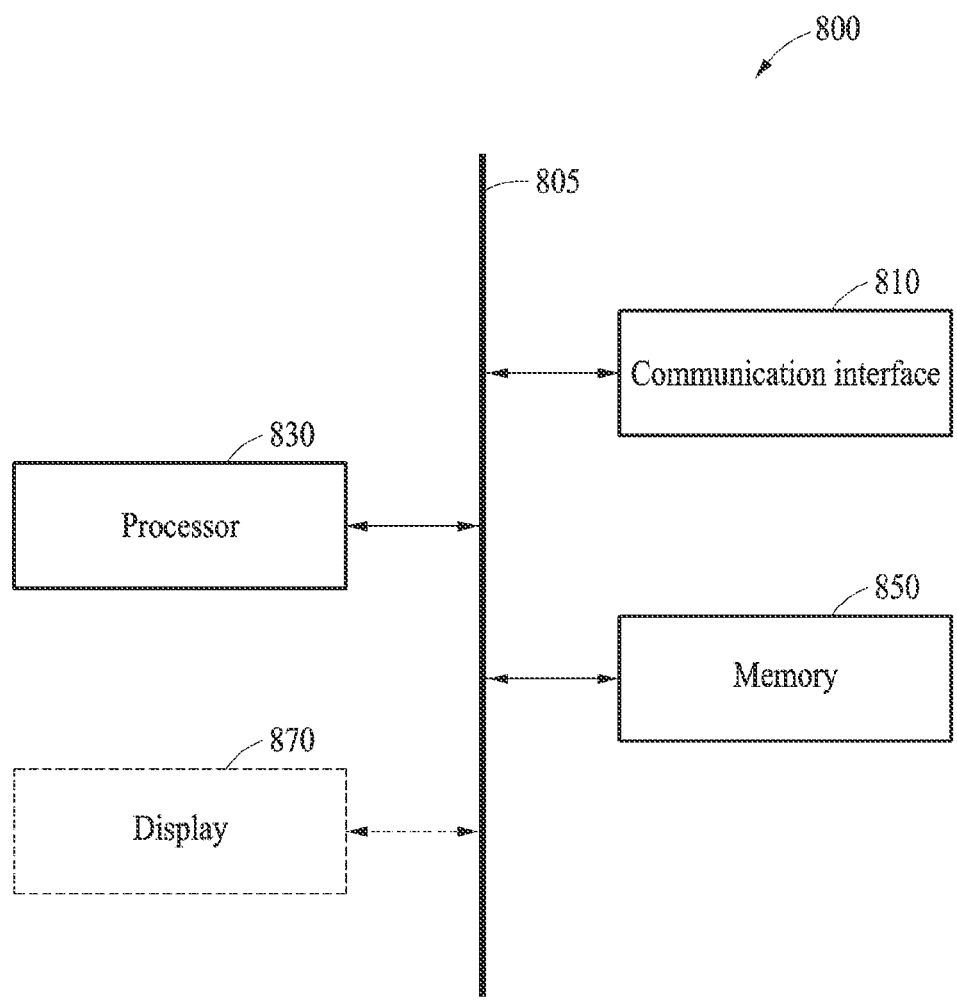
FIG. 8 illustrates an example of a segmentation apparatus.

FIG. 8 illustrates an example of a segmentation apparatus 800. Referring to FIG. 8, a segmentation apparatus 800 includes a communication interface 810, a processor 830, a memory 850, and a display 870. The communication interface 810, the processor 830, the memory 850, and the display 870 may be connected to each other via a communication bus 805.

The communication interface 810 may receive image frames including a current frame and at least one adjacent frame adjacent to the current frame. The at least one adjacent frame may be, for example, a previous frame adjacent to the current frame, or a next frame adjacent to the current frame.

The processor 830 may calculate a feature map that aggregates the image frames based on temporal information between the current frame and the adjacent frame that are received by the communication interface 810. The processor 830 may extract a feature of a ROI corresponding to each of instances or objects included in the current frame from the feature map. The processor 830 may predict an object class corresponding to the ROI based on the feature of the ROI. The processor 830 may perform segmentation of the instances by repeatedly correcting an amodal mask predicted corresponding to the object class based on the feature of the ROI.

Also, the processor 830 may perform one or more of the methods described with reference to FIGS. 1 through 7, or an algorithm corresponding to one or more of the methods. The processor 830 may be a hardware-implemented segmentation apparatus having a circuit that is physically structured to execute desired operations. For example, the desired operations may include code or instructions included in a program. The hardware-implemented segmentation apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 830 is given below.

The processor 830 may execute a program and may control the segmentation apparatus 800. Code of the program executed by the processor 830 may be stored in the memory 850.

The memory 850 may store the image frames received by the communication interface 810. The memory 850 may store an amodal mask generated by the processor 830 and/or a result of the segmentation of the instances performed by the processor 830. Also, the memory 850 may store the feature map calculated by the processor 830, the feature of the ROI, and/or the object class predicted by the processor 830.

As described above, the memory 850 may store a variety of information generated in a processing process of the above-described processor 830. Also, the memory 850 may store a variety of data and programs. The memory 850 may include, for example, a volatile memory or a non-volatile memory. The memory 850 may include a high-capacity storage medium such as a hard disk to store a variety of data.

In an example, the volatile memory device may be, for example, a dynamic random-access memory (DRAM), a static RAM (SRAM), a thyristor RAM (T-RAM), a zero-capacitor RAM (Z-RAM), or a twin-transistor RAM (TTRAM).

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 850 is given below.

Depending on examples, the segmentation apparatus 800 may display the amodal mask generated by the processor 830 using the display 870. In an example, the display 870 is a physical structure that includes one or more hardware components that provide the ability to render a user interface, render a display, and/or receive user input.

The segmentation apparatus 800 may correspond to apparatuses in various fields, for example, an advanced driver-assistance system (ADAS), a head-up display (HUD), a three-dimensional (3D) digital information display (DID), a navigation device, a neuromorphic device, a 3D mobile device, a smartphone, a smart television (TV), a smart vehicle, an Internet of Things (IoT) device, a medical device, and a measuring device. The 3D mobile device may be understood to include, for example, a display device configured to display augmented reality (AR), virtual reality (VR), and/or mixed reality (MR), a head-mounted display (HMD), and a face-mounted display (FMD).

The segmentation apparatus 800 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the segmentation method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A segmentation method comprising:
   receiving image frames comprising a current frame and an adjacent frame to the current frame;
   determining a feature map to aggregate the image frames based on temporal information between the current frame and the adjacent frame;
   extracting a feature of a region of interest (ROI) corresponding to instances included in the current frame from the feature map;
   predicting a class of an object corresponding to the ROI based on the feature of the ROI; and
   segmenting the instances by correcting an amodal mask predicted corresponding to the class of the object based on the feature of the ROI, including weighting the amodal mask by a confidence map and segmenting the instances based on the weighted amodal mask.

2. The segmentation method of claim 1, wherein the segmenting of the instances comprises:
   predicting an amodal mask corresponding to the class of the object based on the feature of the ROI; and
   performing the segmentation of the instances by repeatedly applying the predicted amodal mask to the feature of the ROI.

3. The segmentation method of claim 2, wherein the predicting of the amodal mask comprises propagating the feature of the ROI from a visible area of a target instance corresponding to the class of the object to an occluded area of the target instance and predicting the amodal mask corresponding to the target instance.

4. The segmentation method of claim 3, wherein the predicting of the amodal mask comprises:
   spatially propagating the feature of the ROI by transferring a feature corresponding to the visible area through convolution layers and expanding a receptive field to the occluded area;
   expanding a spatial dimension of the feature of the ROI using deconvolution layers; and
   predicting the amodal mask corresponding to the target instance in the expanded spatial dimension.

5. The segmentation method of claim 1, wherein the segmenting of the instances comprises:
   repeatedly predicting the amodal mask by spatially propagating the feature of the ROI from a visible area of a target instance corresponding to the class of object class to an occluded area of the target instance;
   predicting a modal mask corresponding to the visible area based on the feature of the ROI;
   predicting an occluded mask corresponding to the occluded area based on the feature of the ROI; and
   performing the segmentation of the instances based on a combination of the amodal mask, the modal mask, and the occluded mask.

6. The segmentation method of claim 5, wherein the segmenting of the instances based on the combination of the amodal mask, the modal mask, and the occluded mask comprises:
   calculating a first confidence corresponding to a pixel-wise probability of the modal mask;
   calculating a second confidence corresponding to a pixel-wise probability of the occluded mask;
   weighting the amodal mask by a confidence map based on at least one of the first confidence or the second confidence; and
   performing the segmentation of the instances using the weighted amodal mask.

7. The segmentation method of claim 5, wherein the spatially propagating of the feature of the ROI comprises transferring a feature corresponding to the visible area through convolution layers to the occluded area.

8. The segmentation method of claim 1, wherein the segmenting of the instances comprises:
   predicting an initial attention mask corresponding to the class of the object based on the feature of the ROI;
   extracting an initial mask corresponding to the class of the object from the initial attention mask;
   generating the amodal mask by repeatedly applying the feature of the ROI to the initial mask; and
   segmenting the instances using the amodal mask.

9. The segmentation method of claim 8, wherein the generating of the amodal mask comprises:
   performing first masking by applying the initial mask to the feature of the ROI;
   predicting an attention mask corresponding to the object class based on a first masked feature generated through the first masking;
   performing second masking by applying the attention mask to the feature of the ROI; and
   generating the amodal mask based on a second masked feature generated through the second masking.

10. The segmentation method of claim 1, wherein the extracting of the feature of the ROI comprises extracting the feature of the ROI from the feature map using a region proposal network (RPN).

11. The segmentation method of claim 1, wherein the extracting of the feature of the ROI comprises:
    selecting an instance comprising an occluded area in the current frame from among the instances; and
    extracting a feature of the ROI corresponding to the selected instance from the feature map using a region proposal network (RPN).

12. The segmentation method of claim 11, wherein the extracting of the feature of the ROI corresponding to the selected instance comprises:
- filtering bounding boxes respectively corresponding to the instances using a cascade structure based on a non-maximum suppression (NMS) scheme, the bounding boxes comprising locations of the instances and objectness scores corresponding to the instances; and
- extracting the feature of the ROI corresponding to the selected instance from the feature map based on the filtered bounding boxes.

13. The segmentation method of claim 1, wherein the predicting of the class of the object comprises:
- calculating scores of all object classes included in the ROI by bounding boxes respectively corresponding to the instances based on the feature of the ROI; and
- predicting the class of the object based on the scores of all the object classes.

14. The segmentation method of claim 1, wherein the determining of the feature map comprises:
- extracting features corresponding to the image frames;
- spatially aligning the features with the current frame via warping between the current frame and the adjacent frame; and
- calculating the feature map by aggregating the aligned features.

15. The segmentation method of claim 14, wherein the spatially aligning of the features comprises:
- estimating an optical flow that represents a pixel-level motion between the current frame and the adjacent frame; and
- spatially aligning the features with the current frame via the warping, based on the optical flow.

16. The segmentation method of claim 1, wherein the segmenting of the instances comprise repetitively segmenting the instances by correcting the amodal mask predicted corresponding to the class of the object based on the feature of the ROI.

17. The segmentation method of claim 1, wherein the adjacent frame comprises a frame temporally previous to the current frame or a frame temporally following the current frame.

18. A non-transitory computer-readable storage medium storing instructions that, when executed by a processor, cause the processor to perform the segmentation method of claim 1.

19. A segmentation apparatus comprising:
- a communication interface configured to receive image frames comprising a current frame and at least one adjacent frame adjacent to the current frame; and
- a processor configured to determine a feature map to aggregate the image frames based on temporal information between the current frame and the adjacent frame, to extract a feature of a region of interest (ROI) corresponding to instances included in the current frame from the feature map, to predict a class of an object corresponding to the ROI based on the feature of the ROI, and to segment the instances by correcting an amodal mask predicted corresponding to the class of the object based on the feature of the ROI, including weighting the amodal mask by a confidence map and segmenting the instances based on the weighted amodal mask.

20. The segmentation apparatus of claim 19, wherein the processor is further configured to predict an amodal mask corresponding to the class of the object based on the feature of the ROI, and to perform the segmentation of the instances by repeatedly applying the predicted amodal mask to the feature of the ROI.

21. The segmentation apparatus of claim 20, wherein the processor is further configured to propagate the feature of the ROI from a visible area of a target instance corresponding to the class of the object to an occluded area of the target instance, and to predict the amodal mask corresponding to the target instance.

22. The segmentation apparatus of claim 19, wherein the processor is further configured to repeatedly predict the amodal mask by spatially propagating the feature of the ROI from a visible area of a target instance corresponding to the class of the object to an occluded area of the target instance, to predict a modal mask corresponding to the visible area based on the feature of the ROI, to predict an occluded mask corresponding to the occluded area based on the feature of the ROI, and to perform the segmentation of the instances based on a combination of the amodal mask, the modal mask, and the occluded mask.

23. The segmentation apparatus of claim 19, wherein the processor is further configured to predict an initial attention mask corresponding to the class of the object based on the feature of the ROI, to extract an initial mask corresponding to the class of the object from the initial attention mask, to generate the amodal mask by repeatedly applying the feature of the ROI to the initial mask, and to segment the instances using the amodal mask.

\* \* \* \* \*